United States Patent
Corticelli

(10) Patent No.: US 8,411,199 B2
(45) Date of Patent: Apr. 2, 2013

(54) TRANSPORT DEVICE FOR AN INSTRUMENT FOR PHOTO, VIDEO, AUDIO RECORDING OR THE LIKE

(75) Inventor: Andrea Corticelli, Casalecchio di Reno (IT)

(73) Assignees: Andrea Corticelli (IT); Alessandro Poli (IT)

( * ) Notice: Subject to any disclaimer, the term of this patent is extended or adjusted under 35 U.S.C. 154(b) by 171 days.

(21) Appl. No.: 12/736,036

(22) PCT Filed: Mar. 2, 2009

(86) PCT No.: PCT/IB2009/000389
§ 371 (c)(1),
(2), (4) Date: Sep. 23, 2010

(87) PCT Pub. No.: WO2009/109828
PCT Pub. Date: Sep. 11, 2009

(65) Prior Publication Data
US 2011/0007207 A1  Jan. 13, 2011

(30) Foreign Application Priority Data
Mar. 6, 2008 (IT) .............................. BO2008A0149

(51) Int. Cl.
*H04N 5/225* (2006.01)
*B60R 9/00* (2006.01)
*A45F 5/00* (2006.01)
*B65D 85/38* (2006.01)
*B65D 65/00* (2006.01)

(52) U.S. Cl. ........ 348/375; 348/373; 348/374; 348/376; 224/315; 224/271; 206/316.2; 206/433; 206/265

(58) Field of Classification Search .......... 348/373–376; 224/315, 271, 908, 197–200, 250; 206/316.2, 206/269, 811, 433, 265, 501, 521; 396/419, 396/420; 248/187.1
See application file for complete search history.

(56) References Cited

U.S. PATENT DOCUMENTS

| 3,520,241 | A | | 7/1970 | Caldwell |
| 4,461,411 | A | * | 7/1984 | Harrow .......................... 224/617 |
| 4,714,184 | A | | 12/1987 | Young et al. |
| 4,929,973 | A | * | 5/1990 | Nakatani ..................... 248/177.1 |
| 5,014,892 | A | | 5/1991 | Copeland |
| 5,251,800 | A | | 10/1993 | Leenders |
| 5,375,749 | A | * | 12/1994 | Oliva ............................ 224/271 |
| 2005/0167458 | A1 | * | 8/2005 | Weiss ............................ 224/250 |

OTHER PUBLICATIONS

International Search Report.

* cited by examiner

*Primary Examiner* — Nhan T Tran
*Assistant Examiner* — Marly Camargo
(74) *Attorney, Agent, or Firm* — Timothy J. Klima; Shuttleworth & Ingersoll, PLC

(57) ABSTRACT

The transport device for an instrument (2) for photo, video, audio recording or the like comprises a body (10), connection means (3) accommodated in the body (10) and intended for fixing the instrument (2) to the device (1), supporting means (4) fixed to the body (10) and intended for anchoring the device (1) to the user's body, and a sustaining element (5) one extremity of which is restrained to the body (10).

12 Claims, 3 Drawing Sheets

TRANSPORT DEVICE FOR AN INSTRUMENT FOR PHOTO, VIDEO, AUDIO RECORDING OR THE LIKE

CROSS REFERENCE TO RELATED APPLICATIONS

This application is the National Stage of PCT/IB2009/000389 filed on Mar. 2, 2009, which claims priority under 35 U.S.C. §119 of Italian Application No. MO2008A000149 filed on Mar. 6, 2008, the disclosure of which is incorporated by reference. The international application under PCT article 21(2) was published in English.

TECHNICAL FIELD

The present invention falls within the sector concerning means of transport and support for the body of a user for cameras and videocameras and in particular relates to a transport device for an instrument for photo, video, audio recording or the like.

BACKGROUND ART

Various systems are known for carrying cameras or the like, which involve fastening the object to be carried, e.g. over the shoulder or in a rucksack on the back, but have the drawback of requiring a long time to take the camera out, thereby preventing quick shooting in unforeseen situations.

Other devices for fastening to the body by means of belt, straps and the like have the drawback of not keeping the camera still, with the risk of damage due to movement.

OBJECT OF THE INVENTION

One object of the present invention is to provide a comfortable and easy-to-use transport device.

Another object is to provide a device that enables the recording instrument carried in it to be quickly extracted.

Another object is to provide a device able to prevent the instrument swinging and its being knocked against the user's body.

A further object is to provide a device able to protect the carried instrument against knocks, water, dust and other contaminants.

Another object is to provide a device able to also transport recording instruments having large overall dimensions such as ready-to-use reflex cameras, e.g., equipped with lenses that are longitudinally even very extended, flashlight and supplementary battery.

These objects are achieved by the present transport device for an instrument for photo, video, audio recording or the like comprising at least a body, said device being characterized in that it comprises:
 connection means accommodated in said body and suitable for fixing said instrument to said device;
 supporting means fixed to said body and intended for anchoring said device to the user's body;
 at least a sustaining element one extremity of which is restrained to said body.

BRIEF DESCRIPTION OF THE DRAWINGS

The characteristics of the present invention are shown here below with special reference to the annexed drawings in which.

EMBODIMENTS OF THE INVENTION

Figure 7:
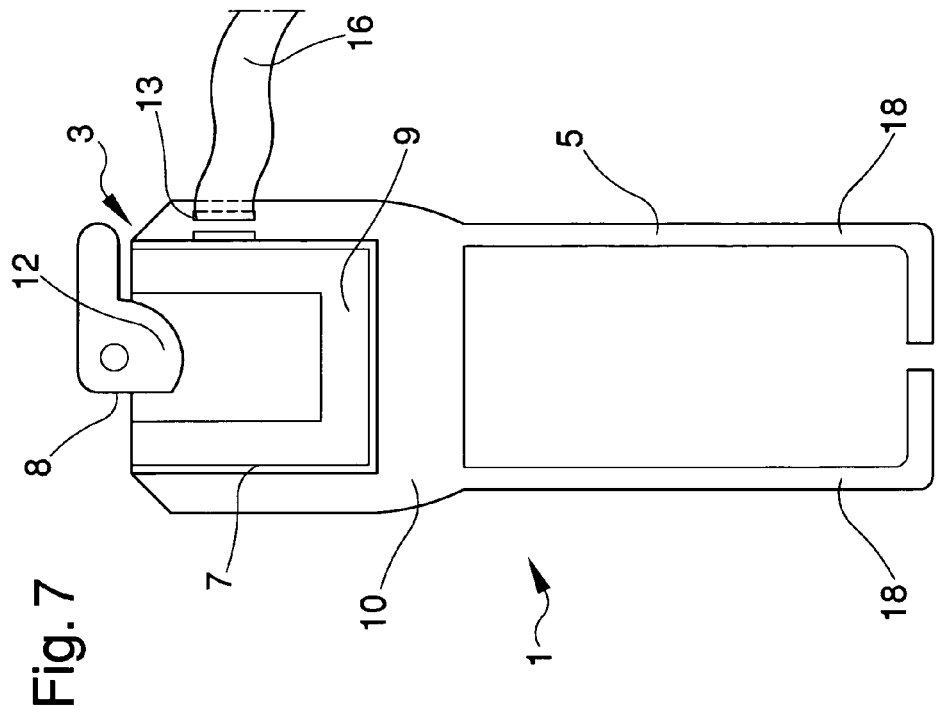
FIG. 7 shows a front view of an alternative embodiment of the device forming the subject of the present invention.
Figure 1:
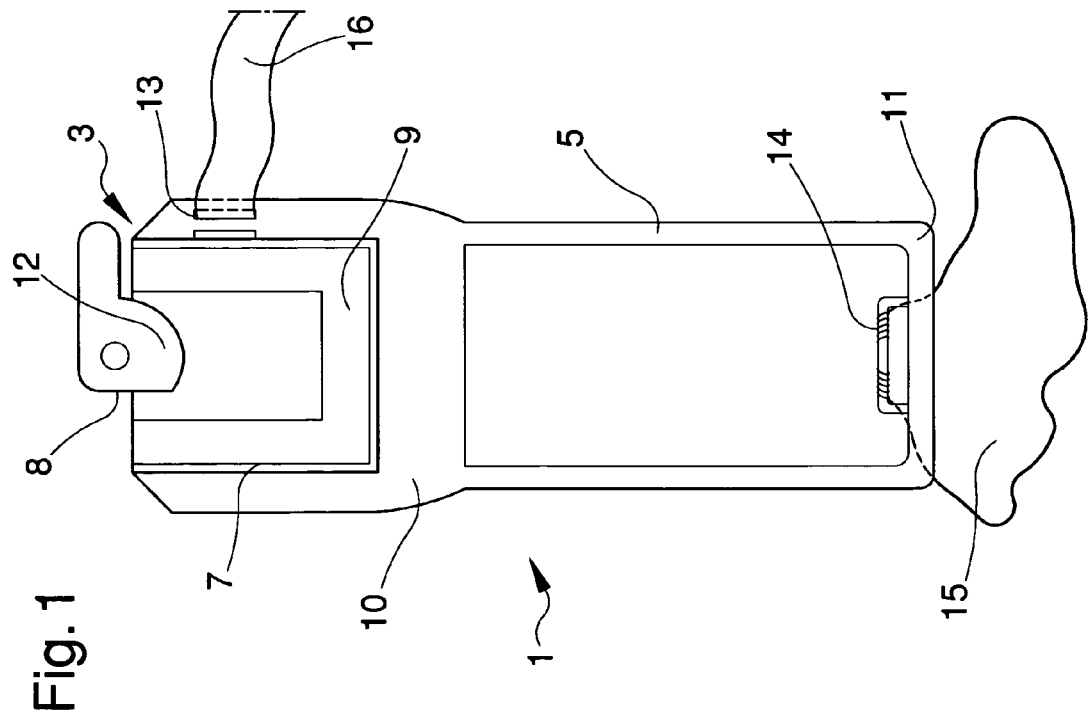
FIG. 1 shows a front view of a preferred embodiment of the device forming the subject of the present invention.
Figure 2:
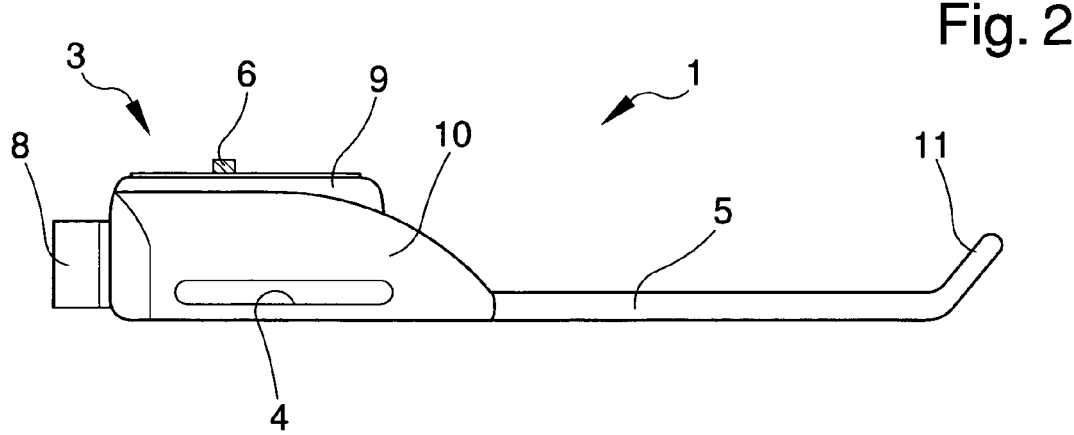
FIG. 2 shows a side view of the device of FIG. 1.
Figure 3:
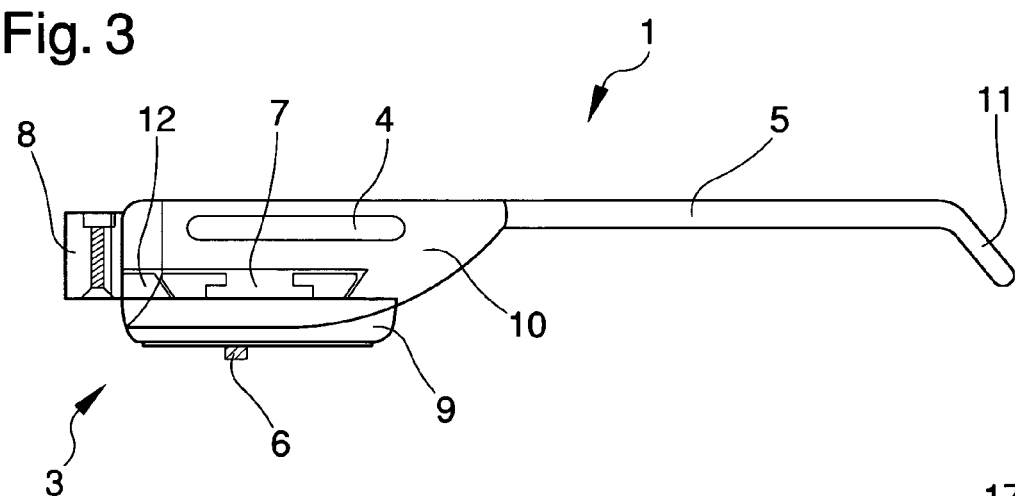
FIG. 3 shows a side and partially sectioned view of the device of FIG. 1.
Figure 5:
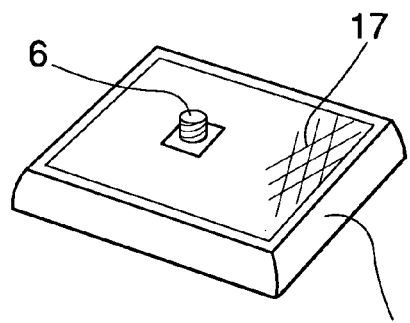
FIG. 5 shows a view from above of a detail of the supporting plate of the device of FIG. 1.
Figure 6:
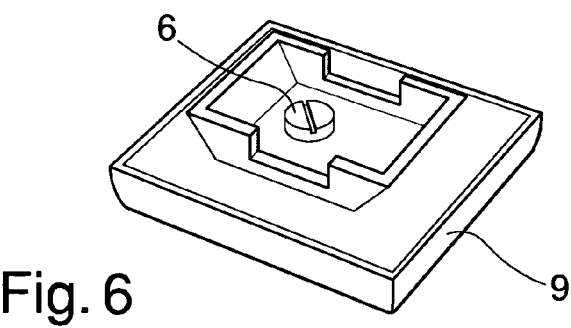
FIG. 6 shows an enlarged view from below of the plate of FIG. 5.
Figure 4:
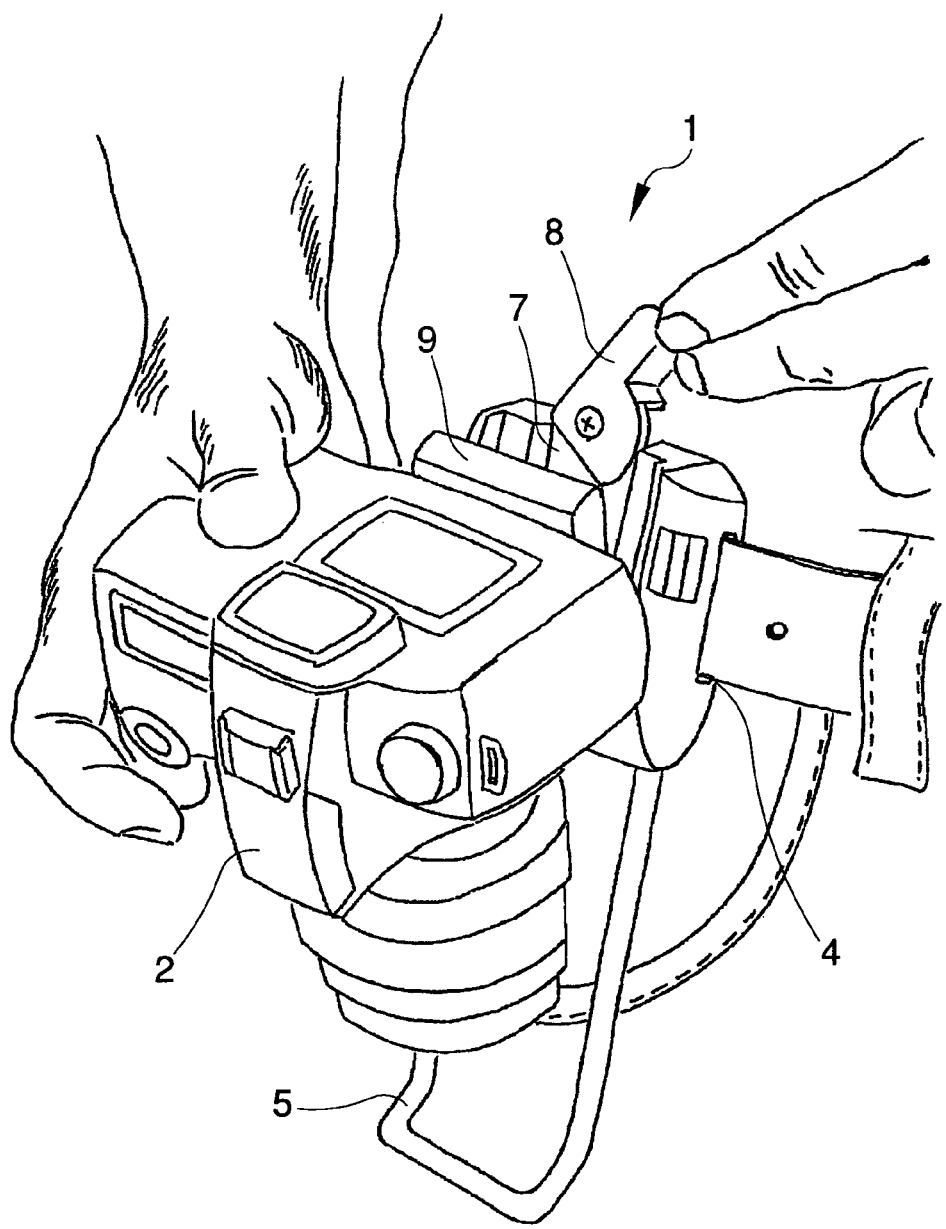
FIG. 4 shows a perspective view of the device of FIG. 1 in an operating condition.

With reference to the embodiment shown in the figures from 1 to 6, by 1 is indicated the device forming the subject of the present invention.

Such device comprises a body 10, connection means 3 accommodated in the body 10 and intended to fasten the instrument 2 to the device 1 and supporting means 4 fixed to the body 10 and intended to anchor the device 1 to the user's body.

The device 1 also comprises a sustaining element 5 one extremity of which is restrained to the body 10.

The connection means consist of a seat 7 intended to accommodate by interlocking in a plate 9 and of a fastening means 8 for fixing the plate 9 to said seat 7.

The plate 9 is intended to locate the instrument 2 and has screw means 6 for the retention of same.

The screw means 6 are of the universal type and compatible with the thread present in the cameras and in the other traditional recording instruments.

The fastening means 8 is composed of a lever fixed turning to the body 10 and having a portion 12 intended to hold the plate 9 in the seat 7. The portion 12 of the lever is shaped more or less like a quarter of circumference.

The supporting means 4 are composed of a slot for the passage of a belt or a strap for fastening the device 1 to the user.

The sustaining element 5 is composed of a bracket and has an elongated, more or less rectangular shape. The sustaining element 5 also has at its free extremity a protruding portion 11 protruding towards the outside of the body 10 in the opposite direction to the user.

In addition, the sustaining element 5 has at least a slot 14 for fastening a protection element 15 for the instrument 2. Such protection element 15 is composed of a cover, a hood or the like made of shockproof, elastic and/or waterproof material.

The body 10 also comprises a transit slot 13 for a coupling element 16 that can be fixed to the instrument 2 to keep this safe.

The coupling element 16 is composed of a belt, a strap, a chain or the like.

The plate 9 has anti-slip means 17 intended, in cooperation with the screw means 6, to keep the instrument 2 in the position preset with respect to the body 10.

The operation of the device envisages inserting a belt or a strap, e.g., worn at torso level or tied around the user's leg, inside the slot of the supporting means 4. The plate 9 is fixed by means of the screw means 6 to the instrument 2 to be carried.

In transport condition, the plate 9 is fitted in the seat 7. To fit the plate 9 in the seat 7 the lever of the fastening means 8 is made to turn so the portion 12 frees the seat 7. During transport, the fastening means 8 holds the instrument 2 in place.

Such operation allows the quick fastening and release of the instrument 2 to/from the device 1.

The connection means 3 permit fixing the instrument 2 in at least 4 different positions.

The sustaining element 5 keeps the device still by exercising pressure on the user's body, thus preventing undesired swinging and movements that could cause the device to knock against the user.

The purpose of the protection element 15 is to protect the instrument against any external agents such as water, dust and other contaminants and also possibly protect it against any knocks.

In a variation of the device 1 not shown in the illustrations, the supporting means 4 are composed of a means for fastening to the belt 16 or to a band worn by the user so as not to have to take off the belt to fasten the device 1 to it.

In another variation, this too not shown, the sustaining element 5 is composed of a plate.

In an alternative embodiment shown in FIG. 7, on the other hand, the sustaining element 5 is composed of a pair of elongated legs 18 extended from the body 10 substantially parallel to one another.

Many other embodiments of the sustaining element 5 are however possible.

In a further variation, not shown in the illustrations, the fastening means 8 is composed of a sliding type fastener with spring release.

One advantage of the present invention is to provide a transport device that is convenient and easy to use.

Another object is to provide a device that ensures the fast extraction of the recording instrument carried in it.

Another object is to provide a device able to prevent the swinging of the instrument and its knocking against the user's body.

A further object is to provide a device able to protect the carried instrument against knocks, water, dust and other contaminants.

Another object is to provide a device able to also transport recording instruments also having large overall dimensions such as ready-to-use reflex cameras, e.g., equipped with lenses that are longitudinally even very extended, flashlight and supplementary battery.

The invention claimed is:

1. A transport device for an instrument having a lens, said transport device comprising:
   (a) a body;
   (b) a plate rigidly fixable to the instrument;
   (c) a connector accommodated in said body and adapted to fix the instrument to said transport device with the lens of the instrument directed downwards, said connector comprising a seat adapted to interlock with said plate and a fastener for fixing said plate to said seat;
   (d) a support fixed to said body and adapted to anchor said transport device to a user's body; and
   (e) a sustaining element comprising an extremity which is restrained to said body; wherein said sustaining element is adapted to keep said transport device still by exercising pressure on the user's body to prevent undesired swinging and movement that would cause the transport device to knock against the user and wherein the sustaining element has an elongated shape and comprises a protruding portion disposed at a free extremity of said sustaining element and protruding towards an outside of said body in a direction away from the user's body for exercising a pressure on the user's body to prevent undesired swinging and movement that would cause the transport device to knock against the user.

2. The transport device according to claim 1, wherein said plate is adapted to locate the instrument and comprises a screw for retaining the instrument.

3. The transport device according to claim 2, wherein said plate comprises an anti-slip element adapted to cooperate with said screw to keep the instrument in a preset position with respect to said body.

4. The transport device according to claim 1, wherein said fastener comprises a lever rotatably fixed to said body and having a portion adapted to hold said plate in said seat.

5. The transport device according to claim 1, wherein said support comprises a slot for the passage of a belt or a strap for fastening the transport device to the user.

6. The transport device according to claim 1, wherein said support comprises a mechanism for fastening the support to the user.

7. The transport device according to claim 1, wherein said sustaining element comprises at least one of a bracket, a plate and an elongated leg.

8. The transport device according to claim 1, wherein said sustaining element has a substantially rectangular shape.

9. The transport device according to claim 1, further comprising a protection element for the instrument, wherein said sustaining element comprises a slot for fastening said protection element.

10. The transport device according to claim 9, wherein said protection element comprises a cover, made of at least one of a shockproof material, an elastic material and a waterproof material.

11. The transport device according to claim 1, wherein said body comprises a transit slot adapted to receive a coupling element (16) that can be fixed to the instrument.

12. The transport device according to claim 1, wherein said sustaining element further comprises an elongated shape adapted to run along a body of the instrument.

* * * * *

UNITED STATES PATENT AND TRADEMARK OFFICE
CERTIFICATE OF CORRECTION

PATENT NO. : 8,411,199 B2  
APPLICATION NO. : 12/736036  
DATED : April 2, 2013  
INVENTOR(S) : Andrea Corticelli It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 187 days.

Signed and Sealed this

First Day of September, 2015

Michelle K. Lee
*Director of the United States Patent and Trademark Office*